(12) United States Patent
Buil et al.

(10) Patent No.: US 8,126,157 B2
(45) Date of Patent: Feb. 28, 2012

(54) APPARATUS AND METHOD FOR SHARING CONTENTS VIA HEADPHONE SET

(75) Inventors: Vincent Paulus Buil, Eindhoven (NL); Gerard Hollemans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1213 days.

(21) Appl. No.: 11/719,147

(22) PCT Filed: Nov. 11, 2005

(86) PCT No.: PCT/IB2005/053725
§ 371 (c)(1),
(2), (4) Date: May 11, 2007

(87) PCT Pub. No.: WO2006/051505
PCT Pub. Date: May 18, 2006

(65) Prior Publication Data
US 2009/0097672 A1    Apr. 16, 2009

Related U.S. Application Data

(60) Provisional application No. 60/627,694, filed on Nov. 12, 2004.

(51) Int. Cl.
*H04R 1/10* (2006.01)
*H04B 7/00* (2006.01)
(52) U.S. Cl. ...... 381/74; 381/384; 455/575.2; 455/41.2; 455/41.3; 380/270
(58) Field of Classification Search .................. 381/74, 381/315, 384; 455/90.1–90.3, 569.1, 575.2, 455/11.1, 3.06, 41.1–41.3; 380/270, 283
See application file for complete search history.

(56) References Cited

U.S. PATENT DOCUMENTS

| 5,757,929 | A  | * | 5/1998 | Wang et al. ................... 381/300 |
| 5,881,390 | A  |   | 3/1999 | Young |
| 6,372,974 | B1 |   | 4/2002 | Gross |
| 7,181,024 | B1 |   | 2/2007 | Oba et al. |
| 7,660,420 | B1 | * | 2/2010 | Narayan et al. ............... 380/274 |
| 7,817,960 | B2 | * | 10/2010 | Tan et al. ..................... 455/11.1 |

(Continued)

FOREIGN PATENT DOCUMENTS
EP    0982732 A1    3/2000
(Continued)

OTHER PUBLICATIONS

Arianna Bassoli et al, :tunA: Local Music Sharing with Handheld W-Fi Devices, Human Connectedness Group Media Lab Europe, http://www.medialaberupe.org/hc/publications/Bassoli04TunaWW.pdf SC3-Refer Portions Highlighted.

(Continued)

*Primary Examiner* — Xu Mei

(57) ABSTRACT

The present invention relates to sharing of content between multiple users. A data player(10) decodes pre-stored audio data therein using a decoding function, and a converter converts the decoded digital data to analog to a headphone set in communication with the data player. When another user places his or her headphone set (2,4) close to the data player (10), the data player(10) confirms whether it has right to receive transmission from the data player, and after successful verification, reproduced data from the data player can be shared by the users.

29 Claims, 5 Drawing Sheets

U.S. PATENT DOCUMENTS

| | | | |
|---|---|---|---|
| 2002/0039424 A1 | 4/2002 | Watanuki | |
| 2003/0100274 A1* | 5/2003 | Brown | 455/90 |
| 2004/0107271 A1 | 6/2004 | Ahn et al. | |
| 2004/0125958 A1* | 7/2004 | Brewster et al. | 380/270 |
| 2008/0240440 A1* | 10/2008 | Rose et al. | 380/277 |

FOREIGN PATENT DOCUMENTS

| | | | |
|---|---|---|---|
| JP | 2001144662 A | 5/2001 | |
| JP | 2004048601 A | 2/2004 | |
| JP | 2004065363 A | 3/2004 | |
| KE | 20020089631 A | 11/2002 | |
| WO | WO03077470 A1 | 9/2003 | |

OTHER PUBLICATIONS

Arianna Bassoli et al., "TunA: A Mobile Music Experience to Foster Local Interactions", Human Connectedness Group, http://www.medialaberupe.org/hc/publications/Bassoli03TunaUBICOMP.pdf SC3-Refer Portions Highlighted.

"Specification of the Bluetooth System", Core, version 1.0B, Dec. 1999, Chapter A, Wireless Communications Made Easy, vol. 1 pp. 1-244, Xp002248532.

"Specification of the Bluetooth System", Core, version 1.OB, Dec. 1999, Chapter A, Wireless Communication Made Easy, vol. 1, pp. 1-244, XP002248532.

* cited by examiner ered to as a
APPARATUS AND METHOD FOR SHARING CONTENTS VIA HEADPHONE SET The present invention allows content sharing between users of a communication system and, more particularly, between a digital data player and a data processing method for sharing contents using headphone sets.

A digital data player such as an MP3 player is capable of downloading and reproducing desired music from a communication network. As a large collection of digital music is readily available, users often transfer content from one user to another, thus allowing the other user to access the music. However, sharing music with a passerby that one might meet on the train or in the park, for example, requires exchanging one's headphone or plugging it in the other person's player. Thus, there is a need for an improved method and apparatus that enable users to share content directly.

Figure 1:
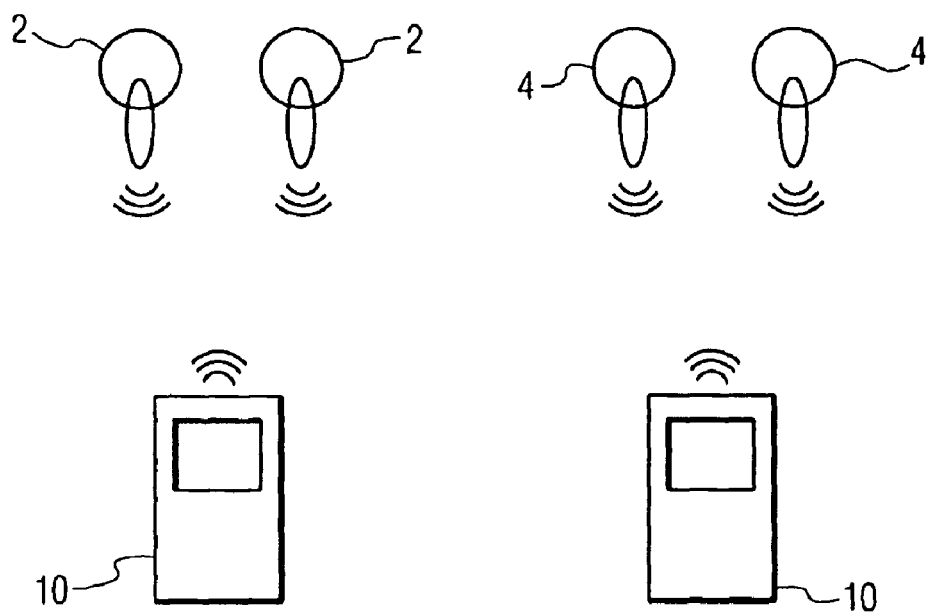
FIG. 1 illustrates two portable devices whereto embodiments of the present application may be applicable.

Referring to FIG. 1, there is shown a diagram where the embodiment of the present invention may be applicable. When two persons shares music from a single player according to the teachings of the invention, a connection between the player and two headphone sets (or ear pieces) 2, 4 is made by holding the headphone set or one of the ear pieces close to the other person's player. A disposable encryption key is exchanged when devices are near each other, thus allowing the sharing of music without any intervention by the user. The invention may also use near-field communication (NFC) in the form of RFID tags to exchange wireless network keys for sharing music. To this end, the headphones 2, 4 are provided with small RFID tags, and the portable player 10 is provided with an RFID detector. Alternatively, one user can give the music to the other user by holding the headphone close to the other's player for a predetermined time period.

Now, a description will be made in detail in regards to this invention with reference to the drawings.

Figure 2:
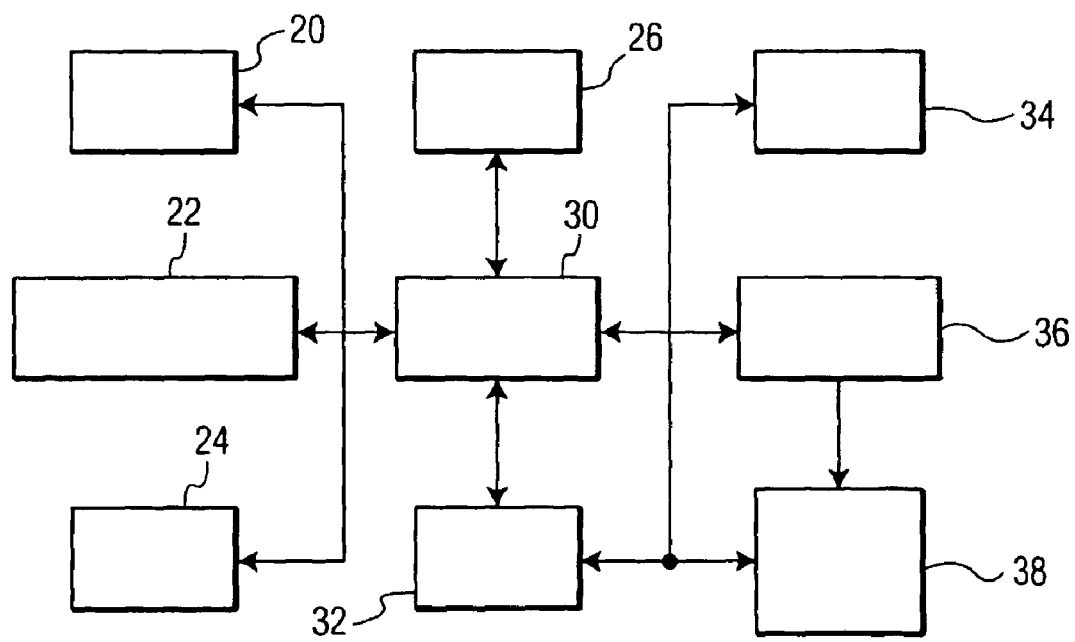
FIG. 2 shows an illustrative block diagram of a portable music player in accordance with the present invention.

Referring to FIG. 2, a digital data player 10 in accordance with an embodiment of the present invention includes a control pad 20 for selecting stored digital music files to be played and for inputting commands that are sent from the user; a cryptographic unit 22 for generating encryption and description key; a display 24, an RFID reader 26 for sending and receiving control signals; a processor 30 for controlling the functions of all functions of the elements in the data player 10 including the signal processing/conversion; a data storage 32 for storing a plurality of MP3 file bit streams; and it may consist of a variety of possible devices, such as a magnetic or optical disk; flash memory or random access memory (RAM); a codec 34 for encoding incoming signals according to an encoding algorithm and decoding an output from the data storage 32 according to a decoding algorithm; a D/A converter 36 for converting the digital MP3 file signal output from the codec 34 into an analog signal and outputting the converted analog signal to an audio output device 38, such as a speaker or a pair of wireless headphone set or ear phones.

The cryptographic unit 22 contains cryptography algorithm based on the encryption and decryption keys to authenticate between two devices. Key management to establish cryptographic connectivity between two entities is well known, thus a detailed description is omitted herein. Briefly, a digital certificate is typically used to verify the identity and/or capabilities of a subject or sender of the digital certificate presented to a recipient. A third party, referred to as a certificate authority, researches the sender desiring certification, and issues a digital certificate to the sender to vouch that the sender of the message is actually who s/he says s/he is. The certificate authority digitally signs the digital certificate, and the sender of the digital certificate presents the signed digital certificate to the relying party who trusts the certificate authority. The relying party computes a cryptographic hash of contents of the digital certificate and uses the cryptographic hash together with a certificate authority's public key, which is readily available, to verify the digital signature. The digital certificate is sent by the sender of the digital certificate to the recipient of the digital certificate, and the recipient obtains a public key of the certificate authority corresponding to a private key used by the certificate authority to compute the cryptographic hash of the digital certificate. The recipient authenticates the signature for the digital certificate with the public key and the computed hash of the digital certificate.

The RFID reader 26 may include an RF transmitter, an RF receiver, an antenna, and logic for controlling the various components of the memory device. The antenna is generally formed on a flexible substrate, while analog RF circuits and digital logic and memory circuits take the form of an integrated circuit ("IC") carried by the substrate and coupled to the antenna. RFID tags may also include a number of discrete components, such as capacitors, transistors, and diodes. Radio frequency identification ("RFID") tags are a commonly-known technology that uses wireless communication memory devices to store information. For example, an item can carry RFID tags providing information, such as serial numbers, and enables efficient retrieval of information regarding the item. Since RFID tags are well-known and widely available, to avoid confusion and prolixity, the nature and structure of these strips and these materials are not further discussed or described in this disclosure.

The audio output device 38 interacts with the wireless headphone sets 2, 4 based on optical and/or RF transmission according to an illustrative embodiment of the invention. The audio output device 38 may include a wireless transmitter having an optical transmitting device (e.g., an LED, a laser, and so forth) and an antenna. In the case of wireless optical transmission, the audio output device 38 transmits optical (digital) signals wirelessly to the wireless ear phones 2, 4 by pulsing its light output (e.g., "off" equals a zero (0), and "on" equals a one (1)).

Figure 3:
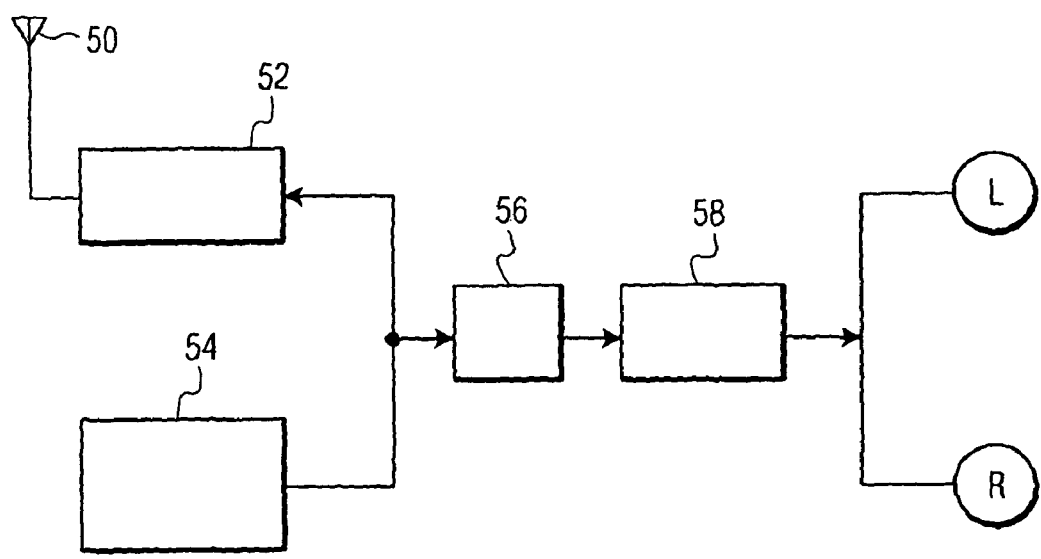
FIG. 3 shows an illustrative block diagram of a wireless headphone set in accordance with the present invention.

Referring to FIG. 3, wireless headphone sets or ear pieces 2, 4 may include an antenna 50, an optical sensing unit 54, which may include a photosensitive device 252, such as a phototransistor, a solar cell(s), a SEED (self-optic effect device), and so forth. The photosensitive device 54 in the optical sensing unit 54 detects the optical signals wirelessly transmitted by the audio output device 38 of the data player 10. The transmission and reception functions of the optical sensing unit 54 can be replaced by the antenna 50, which is used to wirelessly transmit an RF signal. A modulator/demodulator 52 may be included or associated with the antennas 50 to perform such functions as are known to one of ordinary skill in the related art. The optical sensing unit 54 is used for wireless transmission and reception of optical signals, respectively. The antenna 52 is used for wireless transmission and reception of RF signals, respectively. The wireless ear pieces 2, 4 may further include a digital-to-analog converter (DAC) 56 for converting the digital signals into analog signals. The analog signals are then provided to a left-channel ear piece and a right-channel ear piece either directly or after processing by another signal processing/conversion using a filter 58 for filtering of analog signals. It is to be appreciated that different frequencies may be used for right channels and left channels. It should be noted that in view of the teachings of the invention provided herein, one of ordinary skill in the related art will contemplate these and other approaches for facilitating wireless transmission between the data player 10 and the wireless ear pieces 2, 4 while maintaining the spirit and scope of the invention.

In operation, sharing of music between users of a digital data player is initiated when one user holds a headphone set or an ear piece close a data player. A direct communication of the headset with the foreign player can be achieved using RFID provided in the respective devices. The headphone set can be provided with an RFID and the RFID reader in the player can read the ID information and allow the transmission of signals if permission is pre-assigned to the headphone set. Alternatively, the player can permit the transmission of signals to a foreign headphone set by an activation of an enable-control button or command. Note that this could be done when the headphone set uses a limited bandwidth wireless connection (e.g., Bluetooth). If the player also has a larger bandwidth networking (e.g., WLAN 802.11), the player would then function as a router.

In alternate embodiment, a common encryption key may be exchanged by which the ear piece gains access to the music from the player, as described hereinafter.

Figure 4:
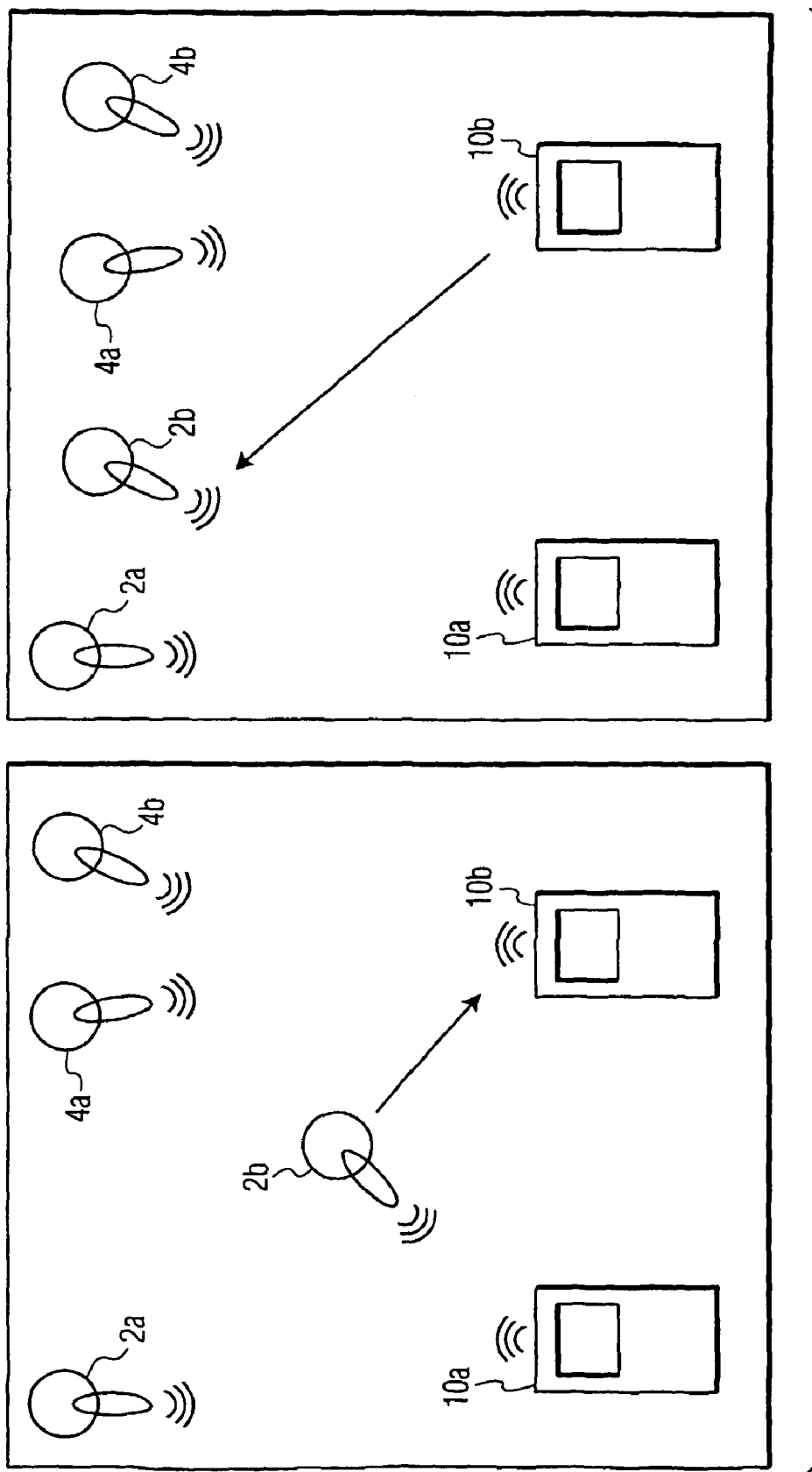
FIG. 4 shows one embodiment of sharing content between users.

Referring to FIG. 4, when a user holds a headphone set or an ear piece 2b close to the player 10b, the player 10b by default encodes a stream of signals with a public key it has received from the headset 2b. Then, the ear piece 2b can only decode the stream transmitting from the player 10b using its own private key.

Figure 5:
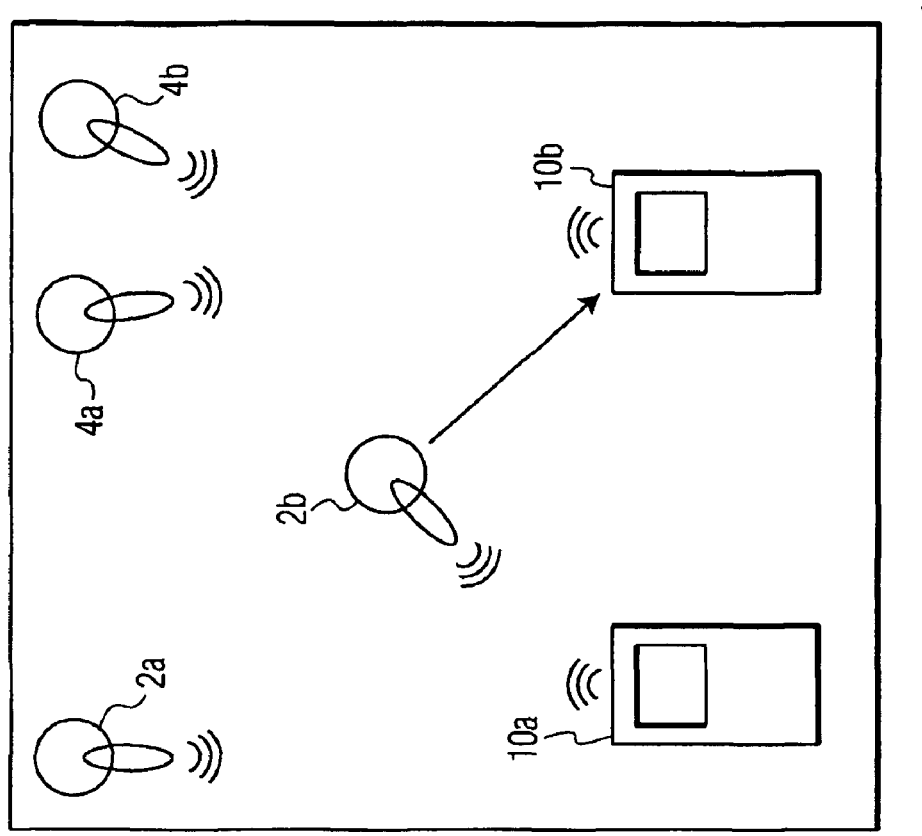
FIG. 5 shows another embodiment of sharing content between users.
Figure 5:
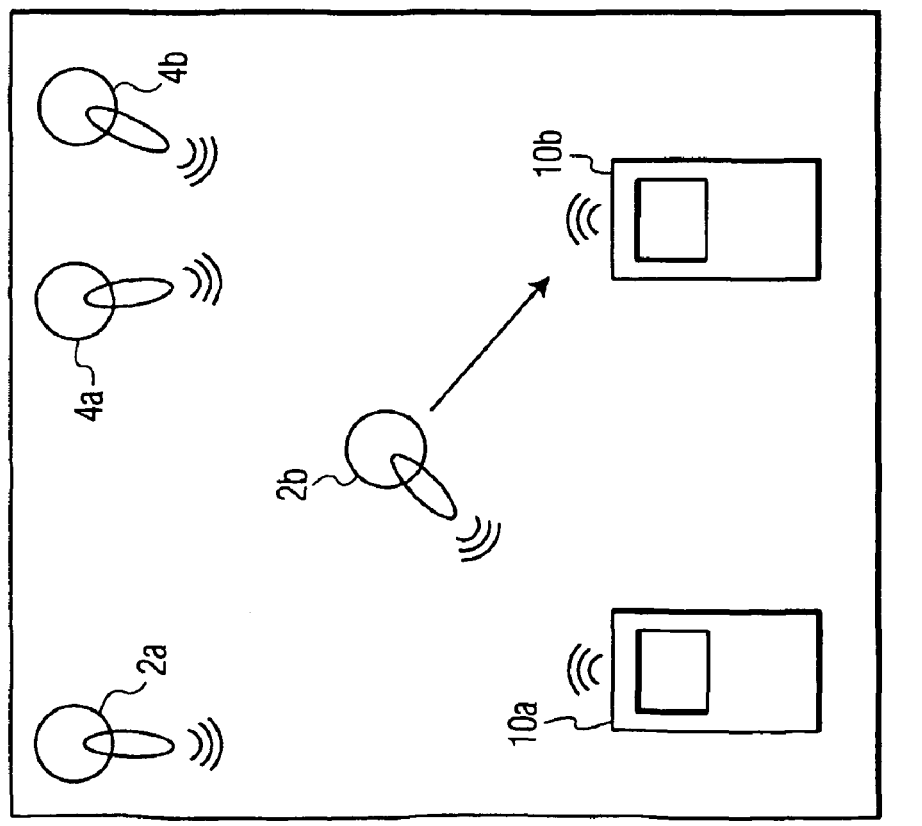

Referring to FIG. 5, when a user holds a headphone set or an ear piece 2b close to the player 10b, the ear piece 2b transmits its ID encrypted using its own private key. In turn, using the public key of the ear piece 2b, the player 10b determines the ID of the ear piece for validation, and, if permitted, allow or deny the communication connection without requiring the user to act.

Figure 6:
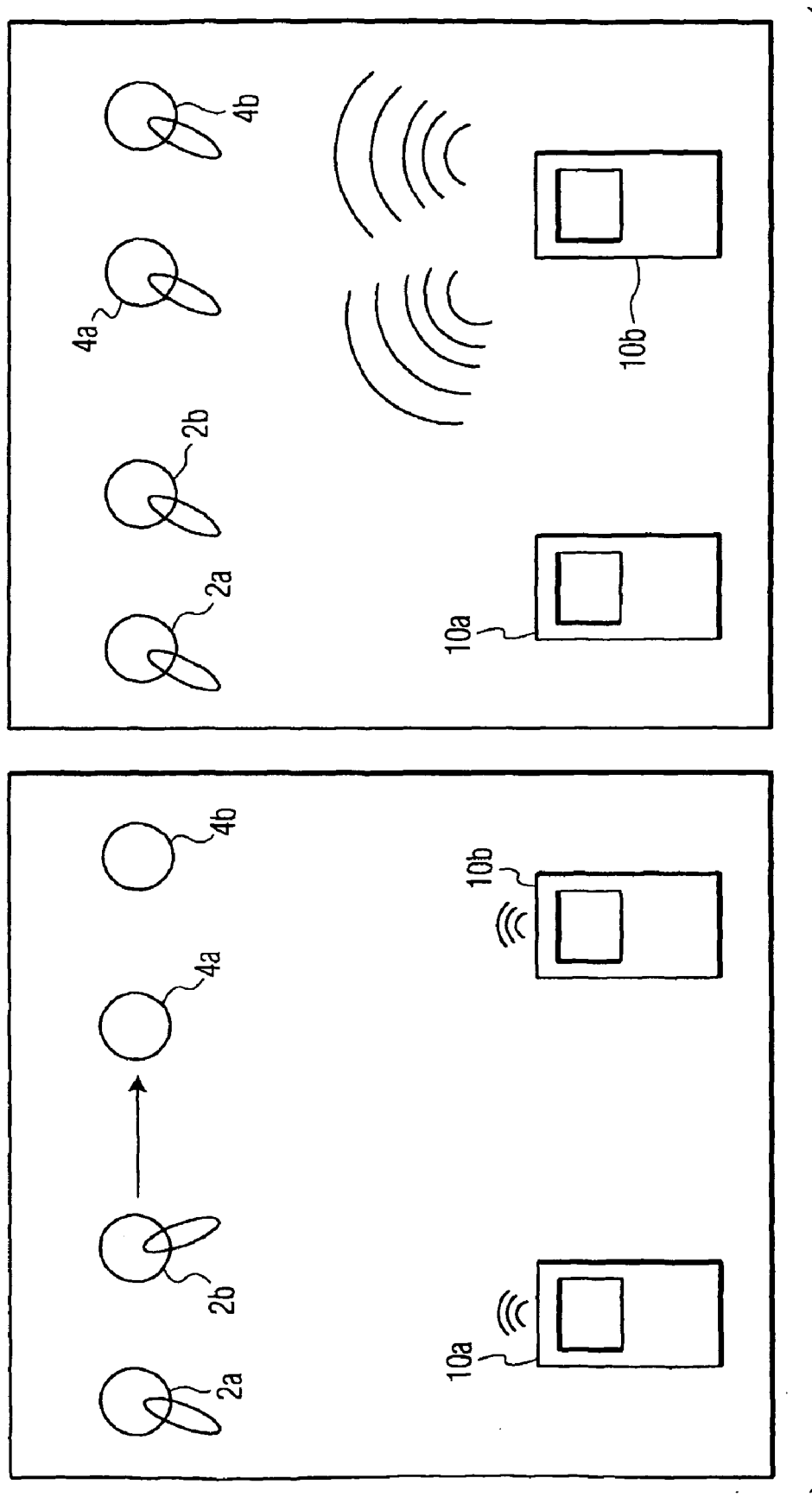
FIG. 6 shows yet another embodiment of sharing content between users.

FIG. 6 shows sharing of music between users of a digital data player according to another embodiment. A user initiates by holding a headphone set 2b (or an ear piece) close another user's headphone 4a. The headphone 4a in turn transmits the signals from the headphone 2b to the player 10b. To this end, the earpiece would be equipped with, for example, a transceiver circuit to relay the signals received from the another headphone to its own player. Upon receiving the signals of headphone set 2b via headphone set 4a, the player 10b transmits the music to both headphones 2 and 4 after the verification process described above with reference to FIGS. 4 and 5. To avoid redundancy, the detailed description is omitted herein.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. For example, one of the headset can be integrated into a wearable garment, such that the teachings of the invention can be applied to a set of earpiece and a wearable garment equipped with a headset. Therefore, it is intended that the present invention not be limited to the particular embodiment disclosed as the best mode contemplated for carrying out the present invention, but that the present invention include all; embodiments falling within the scope of the appended claims.

The invention claimed is:

1. An apparatus for reproducing data, comprising:
a memory for storing a pre-recorded audio data;
a decoder for decoding the audio data for a subsequent output to at least one headphone set in communication with said apparatus; and
an ID reader for detecting at least one foreign headphone set to determine whether said foreign headphone set has a right to access a requested cryptographic class of service
a processor for controlling the functions of all of the elements of the apparatus including signal processing conversion,
a codec for encoding incoming signals according to an encoding algorithm and for decoding and output from the memory according to a decoding algorithm to produce a digital pre-recorded data,
a digital to analog converter for converting said digital pre-recorded data output from the codec into an analog pre-recorded data and outputting the analog pre-recorded data to an audio output device, and
said audio output device for providing said audio data to at said at least one foreign headphone set via one of optical or radio frequency (RF) transmission.

2. The apparatus of claim 1, further comprising a cryptographic unit for providing cryptographic functions.

3. The apparatus of claim 2, wherein said cryptographic unit including at least one preprogrammed encrypting/decrypting key to apply to a digital data received from said foreign headphone set to establish a communication with said foreign headphone set.

4. The apparatus of claim 1, wherein said ID reader is an RFID reader to verify a machine-readable symbol on an RFID tag provided in said at least one headphone set.

5. The apparatus of claim 1, further comprising a control input for controlling the reproducing of said audio data based on a key input from an operator.

6. The apparatus of claim 1, wherein said decoder (34) decodes MP3 files.

7. The apparatus of claim 1, wherein said at least one headphone set is a wireless headphone.

8. The apparatus of claim 1, wherein said at least one headphone set is integrated into a wearable garment.

9. A data reproducing device for sharing reproduced data between a plurality of headphone sets, comprising:
a transmitting unit for transmitting said reproduced data to a first headphone set; and
a detecting unit for detecting a second headphone set present near said data reproducing device or said first headphone set in order to validate whether said second headphone set has a right to receive said reproduced data; and
means for transmitting said reproduced data to said second headphone set after successful validation
a processor for controlling the functions of all of the elements of the data processing device including signal processing conversion,
a codec for encoding incoming signals according to an encoding algorithm and for decoding and output from the memory according to a decoding algorithm to produce a digital pre-recorded data,
a digital to analog converter for converting said digital pre-recorded data output from the codec into an analog pre-recorded data and outputting the analog pre-recorded data to an audio output device, and
said audio output device for providing said audio data to at least one foreign headphone set via one of optical or radio frequency (RF) transmission.

10. The device of claim 9, further comprising a cryptographic unit for providing cryptographic functions to perform the validation of right to receive said reproduced data.

11. The device of claim 10, wherein said cryptographic unit including at least one preprogrammed encrypting/decrypting key to apply to a digital data received from said second headphone set to establish a communication with said second headphone set.

12. The device of claim 9, further comprising an RFID reader to verify a machine-readable symbol on an RFID tag provided in said second headphone set.

13. The apparatus of claim 9, wherein said at least one headphone set is integrated into a wearable garment.

14. The device of claim 9, wherein said first and second headphone sets are wireless headphones.

15. A method for sharing data between a plurality of headphone sets, the method comprising the steps of:
 establishing a communication connection between a data reproducing unit and a first headphone set;
 moving at least one earpiece of a second headphone set in close spatial proximity to said first headphone set associated with a data reproducing unit to establish a communication connection between said first and second headphone sets,
 determining by said data reproducing unit whether said second headphone set has a right to receive data transmission from said data reproducing unit based on said communication connection; and
 upon successful determination, transmitting the data transmission to said second headphone set.

16. The method of claim 15, wherein said detection is validated by applying encrypting/decrypting key to digital data received from said second headphone set.

17. The method of claim 15, wherein said detection is validated upon confirmation of a machine-readable symbol on an RFID tag provided in said second headphone set.

18. The method of claim 15, wherein said first and second headphone sets are wireless headphones.

19. The method of claim 15, wherein said at least one headphone set is integrated into a wearable garment.

20. A method for sharing data between a plurality of headphone sets, the method comprising the steps of:
 moving at least one earpiece of a second headphone set in close spatial proximity to a data reproducing unit to establish a communication connection between said foreign headphone set and said data reproducing unit,
 exchanging a common encryption key between the first headphone set and one of said data reproducing unit or said first headphone set,
 encoding a stream of signals at the data reproducing unit using the previously exchanged common encryption key,
 determining by said data reproducing unit whether said foreign headphone set has a right to receive data transmission from said data reproducing unit; and
 upon successful determination, transmitting the data transmission to said second headphone set
 decoding the data transmission from the data reproducing unit at the second headphone set using a private key associated with the public key.

21. A method for sharing data between a plurality of headphone sets, the method comprising the steps of:
 moving at least one earpiece of a foreign headphone set in close spatial proximity to a data reproducing unit to establish a communication connection between said foreign headphone set and said data reproducing unit,
 exchanging a common encryption key between the foreign headphone set and said data reproducing unit,
 transmitting an ID of the foreign headphone set to the data reproducing unit using a private key of the foreign headphone set,
 determining by said data reproducing unit the ID of the foreign headphone set to determine whether said foreign headphone set has a right to receive data transmission from said data reproducing unit; and
 upon successful determining the ID of the foreign headphone set at the data reproducing device, allowing a communication connection between said data reproducing unit and said foreign headphone set.

22. A method for sharing data between a plurality of headphone sets, the method comprising the steps of:
 moving at least one earpiece of a foreign headphone set in close spatial proximity to a first headphone set associated with a data reproducing unit to establish a communication connection between said foreign headphone set and said first headphone set,
 establishing a communication connection between said first headphone set and said data reproducing unit,
 determining by said data reproducing unit whether said foreign headphone set has a right to receive data transmission from said data reproducing unit; and
 upon successful determination, transmitting the data transmission to said foreign headphone set from said data reproducing unit via said first headphone set.

23. A data reproducing device for sharing reproduced data between a plurality of wireless headphone sets, comprising:
 a transmitting unit for transmitting said reproduced data to a first wireless headphone set;
 a detecting unit comprising an RFID reader, the detecting unit for detecting a second wireless headphone set present near said data reproducing device or said first headphone set, the RFID reader for verifying a machine-readable symbol on an RFID tag provided in said second headphone set, in order to validate whether said second headphone set has a right to receive said reproduced data; and
 means for transmitting said reproduced data to said second headphone set after successful validation.

24. The device of claim 23, further comprising a cryptographic unit for providing cryptographic functions to perform the validation of right to receive said reproduced data.

25. The device of claim 24, wherein said cryptographic unit including at least one preprogrammed encrypting/decrypting key to apply to a digital data received from said second headphone set to establish a communication with said second headphone set.

26. The apparatus of claim 23, wherein said at least one headphone set is integrated into a wearable garment.

27. A method for sharing data between a plurality of wireless headphone sets, the method comprising the acts of:
 establishing a communication connection between a data reproducing unit and a first wireless headphone set;
 detecting a second wireless headphone set to determine whether said second headphone set has a right to receive data transmission from said data reproducing unit, using an RFID reader for verifying a machine-readable symbol on an RFID tag provided in said second headphone set; and
 upon successful determination, transmitting the data transmission to said second headphone set.

28. The method of claim 27, wherein said detection is validated by applying encrypting/decrypting key to digital data received from said second headphone set.

29. The method of claim 27, wherein said at least one headphone set is integrated into a wearable garment.

* * * * *